E. A. STRAND.
CLUTCH ACTUATING DEVICE.
APPLICATION FILED SEPT. 8, 1913.
1,113,710.
Patented Oct. 13, 1914.
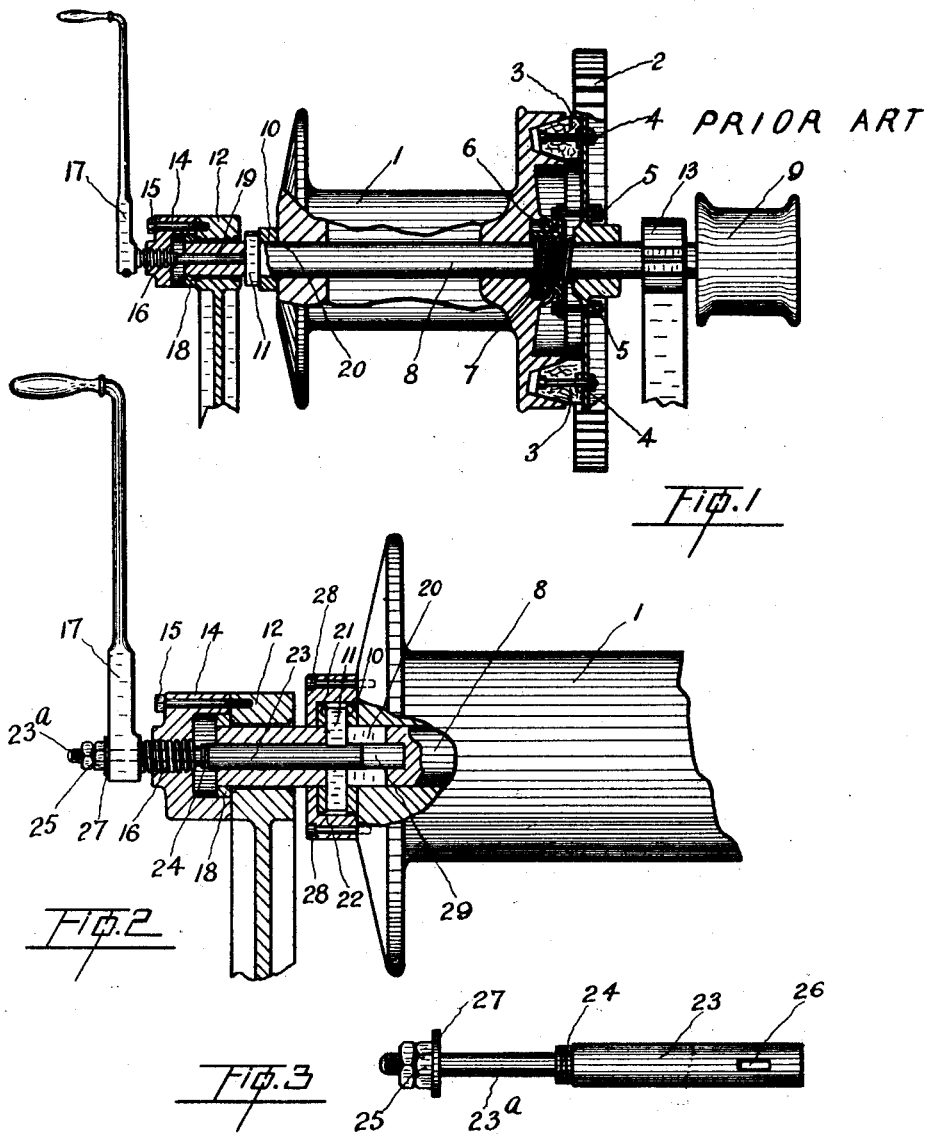
WITNESSES.
B. F. Buxton
E. Hartley.
INVENTOR.
ERIC A. STRAND.
BY Featherstonhaugh & Co.
ATT'YS.

UNITED STATES PATENT OFFICE.

ERIC ALFRED STRAND, OF VANCOUVER, BRITISH COLUMBIA, CANADA.

CLUTCH-ACTUATING DEVICE.

1,113,710.  Specification of Letters Patent.  Patented Oct. 13, 1914.

Application filed September 8, 1913. Serial No. 788,577.

*To all whom it may concern:*

Be it known that I, ERIC ALFRED STRAND, a citizen of the United States, and a resident of the city of Vancouver, in the Province of British Columbia, Canada, have invented certain new and useful Improvements in Clutch-Actuating Devices, of which the following is a specification.

My invention relates to improvements in clutch actuating devices for drum engines, such as hoisting and haulage engines and the like, and the object of my invention is to devise a means for effectively releasing the drums of such engines from the friction blocks, the use of which will insure that the drum will be actually disengaged from the friction blocks when it is intended to be so disengaged, instead of, as often happens at the present time, the drum remaining fast to the friction blocks when the spring disengaging means fails to work properly. I attain this object by the means illustrated in the accompanying drawings in which—

Figure 1 is a longitudinal elevation, in part section, showing the drum and its operating mechanism as in use at the present time. Fig. 2 is an enlarged view of the drum end and friction lever, as shown in Fig. 1, but with my releasing device adapted thereto. Fig. 3 is a view of my friction pin.

Similar figures of reference indicate similar parts throughout the several views.

1 represents the drum of a typical drum engine.

2 is the driving gear.
3 are the friction blocks.
4 are the friction block bolts.
5 are the spring cage bolts.
6 is the spring cage.
7 is the drum spring.
8 is the drum shaft.
9 is a gipsy.
10 is the drum collar.
11 is a cross key.
12 and 13 are the main bearings.
14 is the friction nut.
15 is the friction nut stud.
16 is the friction screw.
17 is the friction lever.
18 is a screw collar.
19 represents the friction pin.
20 is the cross key slot in the shaft.

Referring now to Fig. 1, which illustrates the present arrangement for engaging and releasing the drum on and from the friction blocks, it will be seen that the action is as follows:—To engage the drum 1 on the friction blocks 3 the friction lever 17 is moved to actuate the friction screw 16 inwardly, and, the point of this screw bearing on the end of the friction pin 19, forces it also inwardly. The inner point of this pin 19 in turn bears on the cross key 11 which bears against the drum collar 10, and thus the drum is forced on to the friction blocks 3 to engage tightly therewith. This action compresses the drum spring 7, which remains compressed until the pressure forcing the drum on to the friction blocks is relieved. To disengage the drum from the friction, it is necessary to reverse the action already described, that is, the friction lever 17 is moved to actuate the friction screw 16 outwardly, thus relieving the pressure on the drum end, and allowing the spring 7 to expand and force the drum off the friction blocks 3. Theoretically, the action described in the foregoing is designed as efficient for engaging and releasing the drum, but I find in practice that, while the means for engaging the drum are efficient, the means for disengaging or releasing are not so effective. Referring again to Fig. 1, it will be seen that the releasing of the drum depends entirely on the drum spring 7. It will be understood, of course, that the drum, when engaged, takes a very strong hold of the friction, and therefore a spring sufficient to overcome this hold is necessary. But, if the drum spring 7 is too strong, it is difficult to force the drum against it so that it, the drum, may be engaged on the friction blocks, and if it is weak, it will not force the drum off the friction when required to do so. The result is that, with a weak spring, when the operator moves the lever 17 to release the drum, the pressure on the drum end is relieved, but the drum itself still remains fast on the friction, since the spring 7 is not strong enough to force it off. Consequently, when the machine is started up again, instead of the drum running free, as it is then intended to do, it will turn with the gear and any one in the way of the rope or object being moved is liable to severe injury, in fact, numerous accidents have occurred through this cause. I overcome this defect by the means illustrated in Fig. 2, in which 21 is the cross key collar. 22 is a casing inclosing the collars 10 and 22 and the cross key 11. 23 is my friction pin. 24 are friction disks. 25 are the friction pin nuts. 26 is the cross key slot in my friction pin. 27 is a washer bearing against the friction lever 17. 28 are the casing screws. 29 is an annular recess in the drum shaft to allow for the friction pin working therein.

Referring now to Fig. 2, it will be seen that, instead of the cross key 11 being separate from the friction pin, as in Fig. 1, it is now a part of the pin, being engaged through it in the slot 26, to move with the friction pin 23, either backward or forward.

Referring to Fig. 3, it will be seen that I form my friction pin 23 with a reduced turned extension 23ª, threaded on the outer extremity.

The manner in which the parts are assembled and operated is as follows:—The drum collar 10, which is reduced in thickness to allow the other parts to be adapted to the space available, is placed against the drum, in the usual manner. The friction pin 23 is then pushed into the annular recess 29 in the shaft, this recess being made deep enough to allow for the forward travel of the friction pin 23. The cross key 11 is then driven through the slot 26 and the collar 21 is placed on the shaft and bearing against the cross key. The casing 22 is then placed over all, to bear against the collar 21 as shown in Fig. 2, and is secured to the drum end by means of the screws 28. The friction disks 24 being in position on the reduced extension 23ª, as shown in Fig. 3, the friction screw 16, which has been drilled so that the extension 23ª may pass through it, may then be screwed into the friction nut 14 until its inner point bears on the friction disks 24, as shown in Fig. 2. The friction lever 17 can now be attached to the friction screw, after which the washer 27 and the nuts 25 may be placed on the end of the extension 23ª and adjusted. The adjustment of the nuts 25 is such that the friction screw 16 is free to revolve on the extension 23ª of the friction pin, which passes through it.

Referring now to Fig. 2, it will be seen that, to engage the drum on the friction blocks 3, the friction lever 17 is moved as before to actuate the screw 16 inwardly, the point of which, bearing against the friction disks 24, forces the friction pin 23 and the cross key 11 inwardly to bear against the drum collar 10, thus forcing the drum 1 on to the friction blocks 3 to be engaged therewith. This action is reversed to release the drum from the friction blocks, that is to say, the lever 17 is moved in the opposite direction to actuate the screw 16 outwardly. This causes the lever 17 to bear against the washer 27 which is held by the nuts 25, and to exert an outward pull on the friction pin 23 and the cross key 11. This outward pull is applied to the drum through the collar 21 and the casing 22, to pull the drum away from the friction blocks, so that it will be seen that the actual release of the drum is certain when the parts are operated for that purpose. The drum spring 7 may still be retained, if desired, but it is not now necessary; the actual releasing of the drum being accomplished in the manner just described.

It will be seen, therefore, that I have devised a simple means for effectively releasing the drums of drum engines from the friction blocks, the use of which will insure that the drum will be actually disengaged from the friction blocks when it is intended to be so disengaged, instead of remaining fast on the friction blocks when the spring disengaging means fails to work properly, as often occurs at the present time.

What I claim as my invention is.

In a clutch actuating device, the combination with the main supporting shaft having an axial bore in one end, and diametrically opposed slots leading into the bore, a driving member mounted upon the shaft having an annular friction wedge ring, and a drum also mounted upon the shaft having a wedge screw co-acting with the wedge ring, of a casing secured on one drum end, a pin extending into the longitudinal bore of the supporting shaft and having a diametric slot, a key extending from such slot and through the diametric slots of the shaft into the casing of the drum, annular washers fitting within the casing to each side of the key, a reduced extension to the axial pin, a stationary internally threaded member, a threaded sleeve loosely mounted upon the reduced portion of the axial pin of the main supporting shaft, and nuts threaded on to the reduced portion to hold the sleeve from moving longitudinally, as and for the purpose specified.

Dated at Vancouver, B. C., this 16th day of August, 1913.

ERIC ALFRED STRAND.

Witnesses:
JAMES TAYLOR,
ELIZABETH TAYLOR.